United States Patent
Heinbuch et al.

(10) Patent No.: US 11,643,257 B2
(45) Date of Patent: *May 9, 2023

(54) DISPENSING SYSTEM

(71) Applicant: Ecolab USA Inc., Saint Paul, MN (US)

(72) Inventors: Karl Alan Heinbuch, Roberts, WI (US); Matthew D. Lausted, Hudson, WI (US); Jeffrey Michael Schultz, Woodville, WI (US); Kevin Michael Welle, Waconia, MN (US); Bradley Jacob Johnson, Holcombe, WI (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/567,263

(22) Filed: Jan. 3, 2022

(65) Prior Publication Data

US 2022/0119169 A1 Apr. 21, 2022

Related U.S. Application Data

(63) Continuation of application No. 16/879,958, filed on May 21, 2020, now Pat. No. 11,220,379.

(60) Provisional application No. 62/851,866, filed on May 23, 2019.

(51) Int. Cl.
*B65D 47/24* (2006.01)
*B67D 7/02* (2010.01)

(52) U.S. Cl.
CPC ......... *B65D 47/245* (2013.01); *B67D 7/0277* (2013.01); *B67D 7/0294* (2013.01)

(58) Field of Classification Search
CPC ... B65D 47/245; B67D 7/0277; B67D 7/0294
USPC .............................................. 222/522, 185.1
See application file for complete search history.

(56) References Cited

U.S. PATENT DOCUMENTS

| 2,775,369 A | 12/1956 | Waite |
| 2,790,582 A | 4/1957 | Halpern |
| 3,262,613 A | 7/1966 | Miller |
| 3,305,127 A | 2/1967 | Daniel |
| 4,186,848 A | 2/1980 | Walter |

(Continued)

FOREIGN PATENT DOCUMENTS

| CN | 1224488 A | 7/1999 |
| CN | 1607167 A | 4/2005 |

(Continued)

OTHER PUBLICATIONS

International Patent Application No. PCT/US2020/033924, International Search Report and Written Opinion dated Sep. 10, 2020, 18 pages.

*Primary Examiner* — Patrick M. Buechner
*Assistant Examiner* — Michael J. Melaragno
(74) *Attorney, Agent, or Firm* — Fredrikson & Byron, P.A.

(57) ABSTRACT

A dispensing fitment assembly includes a fitment assembly and a dispensing probe. The fitment assembly includes a fitment housing and a plug. The fitment housing is configured to operatively couple to a container opening of a fluid container. The plug is positioned within an interior portion of the fitment housing. The plug is slidingly movable between an open and closed position. Engagement between the dispensing probe and the interior surface of the plug is configured to move the plug from the closed position to the open position. Disengagement between the dispensing probe and the interior surface of the plug is configured to move the plug from the open to closed position.

20 Claims, 9 Drawing Sheets

(56) References Cited

U.S. PATENT DOCUMENTS

| | | |
|---|---|---|
| 4,375,864 A | 3/1983 | Savage |
| 4,411,287 A | 10/1983 | Hyde |
| 4,445,539 A | 5/1984 | Credle |
| 4,934,655 A | 6/1990 | Blenkush et al. |
| 5,046,645 A | 9/1991 | Hagan et al. |
| 5,095,962 A | 3/1992 | Lloyd-Davies et al. |
| 5,165,578 A | 11/1992 | Laible |
| 5,178,295 A | 1/1993 | Crumrine et al. |
| 5,178,303 A | 1/1993 | Blenkush et al. |
| 5,203,477 A | 4/1993 | Lo |
| 5,353,836 A | 10/1994 | Decler et al. |
| 5,467,806 A | 11/1995 | Stricklin et al. |
| 5,518,020 A | 5/1996 | Nowicki et al. |
| 5,639,064 A | 6/1997 | Decler et al. |
| 5,687,882 A | 11/1997 | Mueller |
| 5,794,670 A | 8/1998 | LaFleur |
| 5,868,281 A | 2/1999 | Bietzer et al. |
| 5,884,648 A | 3/1999 | Savage |
| 5,890,517 A | 4/1999 | Laible |
| 5,911,403 A | 6/1999 | Decler et al. |
| 5,975,489 A | 11/1999 | Decler et al. |
| 5,988,456 A | 11/1999 | Laible |
| 6,126,045 A | 10/2000 | Last |
| 6,138,878 A | 10/2000 | Savage et al. |
| 6,142,345 A | 11/2000 | Laible |
| 6,213,353 B1 | 4/2001 | Haul et al. |
| 6,296,157 B1 | 10/2001 | Erb |
| 6,305,437 B1 | 10/2001 | Edwards et al. |
| 6,354,473 B1 | 3/2002 | Brambach et al. |
| 6,360,925 B2 | 3/2002 | Erb |
| 6,364,163 B1 | 4/2002 | Mueller |
| 6,382,593 B1 | 5/2002 | deCler et al. |
| 6,607,097 B2 | 8/2003 | Savage et al. |
| 6,607,174 B2 | 8/2003 | Weber et al. |
| 6,626,419 B2 | 9/2003 | deCler et al. |
| 6,644,367 B1 | 11/2003 | Savage et al. |
| 6,644,519 B2 | 11/2003 | Last |
| 6,669,062 B1 | 12/2003 | Laible |
| 6,916,007 B2 | 7/2005 | deCler et al. |
| 6,921,113 B1 | 7/2005 | Masblom |
| 6,923,345 B1 | 8/2005 | Laible |
| 6,945,432 B2 | 9/2005 | Laible |
| 6,945,433 B2 | 9/2005 | Laible |
| 6,962,321 B1 | 11/2005 | Savage et al. |
| 6,968,983 B2 | 11/2005 | Laible |
| 6,978,800 B2 | 12/2005 | deCler et al. |
| 6,986,443 B2 | 1/2006 | Laible |
| 7,114,625 B2 | 10/2006 | Jones et al. |
| 7,121,437 B2 | 10/2006 | Kasting |
| 7,237,728 B1 | 7/2007 | Laible |
| 7,357,277 B2 | 4/2008 | Verespej et al. |
| 7,373,959 B2 | 5/2008 | Edwards et al. |
| 7,546,857 B2 | 6/2009 | Chadbourne et al. |
| 7,631,783 B1 | 12/2009 | Laible |
| 7,658,213 B1 | 2/2010 | Anderson et al. |
| 7,690,528 B2 | 4/2010 | Last |
| 7,694,852 B2 | 4/2010 | Last |
| 7,832,599 B2 | 11/2010 | Laible |
| 7,841,492 B2 | 11/2010 | Laible |
| 7,854,354 B2 | 12/2010 | Laible |
| 8,021,457 B2 | 9/2011 | Dema et al. |
| 8,066,157 B2 | 11/2011 | Laible |
| 8,069,878 B2 | 12/2011 | Laible |
| 8,083,107 B2 | 12/2011 | Laible |
| 8,177,143 B2 | 5/2012 | Laible |
| 8,191,735 B2 | 6/2012 | Laible |
| 8,220,665 B2 | 7/2012 | Laible |
| 8,336,743 B2 | 12/2012 | Bellmore |
| D682,103 S | 5/2013 | Jedlicka et al. |
| 8,448,799 B2 | 5/2013 | Thurman et al. |
| D687,719 S | 8/2013 | Last |
| 8,550,302 B1 | 10/2013 | Laible |
| 8,684,026 B2 | 4/2014 | Rundin |
| 8,708,203 B2 | 4/2014 | Laible |
| 8,726,939 B2 | 5/2014 | Laible |
| 8,794,488 B2 | 8/2014 | van der Molen |
| 8,844,776 B2 | 9/2014 | Haas et al. |
| 8,875,726 B2 | 11/2014 | Laible |
| 8,875,958 B2 | 11/2014 | Last |
| 8,881,958 B2 | 11/2014 | Hoonaard |
| 8,893,912 B2 | 11/2014 | Van Der Molen et al. |
| 8,939,302 B2 | 1/2015 | Last et al. |
| 8,939,322 B2 | 1/2015 | Laible |
| 8,950,939 B2 | 2/2015 | Last et al. |
| 9,051,094 B2 | 6/2015 | Brooks |
| 9,126,725 B1 | 9/2015 | Laible |
| 9,145,237 B2 | 9/2015 | Van Der Molen |
| 9,242,847 B1 | 1/2016 | Laible |
| 9,254,943 B2 | 2/2016 | Brooks |
| 9,296,000 B1 | 3/2016 | Laible |
| 9,354,102 B2 | 5/2016 | Zaro et al. |
| 9,370,591 B2 | 6/2016 | Zaro et al. |
| 9,377,111 B2 | 6/2016 | De Muinck et al. |
| 9,394,088 B2 | 7/2016 | Bellmore et al. |
| 9,458,003 B1 | 10/2016 | Laible |
| 9,481,495 B2 | 11/2016 | Bellmore et al. |
| 9,511,907 B2 | 12/2016 | Erickson et al. |
| D777,814 S | 1/2017 | Verhoeven et al. |
| 9,533,814 B2 | 1/2017 | Brooks |
| 9,555,933 B2 | 1/2017 | McKenna et al. |
| 9,573,736 B2 | 2/2017 | Arch et al. |
| 9,605,785 B2 | 3/2017 | Murray et al. |
| D787,650 S | 5/2017 | Erickson |
| 9,737,913 B2 | 8/2017 | Fitzgerald et al. |
| 9,745,112 B2 | 8/2017 | Bellmore et al. |
| 9,751,677 B2 | 9/2017 | Fiere et al. |
| 9,783,347 B2 | 10/2017 | Dostveen |
| D802,035 S | 11/2017 | Verhoeven et al. |
| 9,809,370 B2 | 11/2017 | Bellmore et al. |
| 9,828,159 B1 | 11/2017 | Messacar et al. |
| 9,850,041 B2 | 12/2017 | Arch et al. |
| 9,963,279 B2 | 5/2018 | Huber et al. |
| 10,005,602 B2 | 6/2018 | Van Der Molen |
| 10,035,614 B2 | 7/2018 | van der Meijden et al. |
| 10,065,849 B2 | 9/2018 | Van Der Molen et al. |
| 10,086,393 B2 | 10/2018 | Last |
| 2002/0014608 A1 | 2/2002 | deCler et al. |
| 2002/0092867 A1 | 7/2002 | Last |
| 2003/0062498 A1 | 4/2003 | DeCler et al. |
| 2003/0071234 A1 | 4/2003 | Weber et al. |
| 2003/0196703 A1 | 10/2003 | DeCler et al. |
| 2004/0139704 A1 | 7/2004 | Savage |
| 2005/0101939 A1 | 5/2005 | Mitchell |
| 2005/0247371 A1 | 11/2005 | Chadbourne et al. |
| 2006/0096932 A1 | 5/2006 | Dema et al. |
| 2008/0011785 A1 | 1/2008 | Braun et al. |
| 2009/0090690 A1 | 4/2009 | Walton et al. |
| 2010/0021322 A1 | 1/2010 | Kitahara et al. |
| 2010/0213220 A1 | 8/2010 | Laible |
| 2012/0104029 A1 | 5/2012 | Haas et al. |
| 2012/0255973 A1 | 10/2012 | Schlueter et al. |
| 2012/0261441 A1 | 10/2012 | van den Hoonaard |
| 2013/0092689 A1 | 4/2013 | Rundin |
| 2013/0199662 A1 | 8/2013 | Gebbink et al. |
| 2014/0319094 A1 | 10/2014 | Thurman et al. |
| 2015/0001261 A1 | 1/2015 | Johnson |
| 2016/0122104 A1 | 5/2016 | Bellmore et al. |
| 2016/0214129 A1 | 7/2016 | Last et al. |
| 2016/0244221 A1 | 8/2016 | Schultz, Jr. et al. |
| 2017/0043891 A1 | 2/2017 | Gebbink et al. |
| 2017/0066641 A1 | 3/2017 | Van Der Molen et al. |
| 2017/0283175 A1 | 10/2017 | Gebbink et al. |
| 2017/0334627 A1 | 11/2017 | Fiere et al. |
| 2018/0057236 A1 | 3/2018 | Erickson |
| 2018/0170624 A1 | 6/2018 | Arch et al. |
| 2018/0201405 A1 | 7/2018 | Saito et al. |
| 2018/0251247 A1 | 9/2018 | Gebbink et al. |

FOREIGN PATENT DOCUMENTS

| | | |
|---|---|---|
| EP | 657005 B1 | 4/2000 |
| EP | 892759 B1 | 2/2002 |
| EP | 1185816 B1 | 4/2008 |
| EP | 2051912 B1 | 11/2011 |

(56) References Cited

FOREIGN PATENT DOCUMENTS

| | | | |
|---|---|---|---|
| EP | 2508268 | A1 | 10/2012 |
| EP | 3003899 | B1 | 11/2017 |
| EP | 3099581 | B1 | 11/2017 |
| EP | 3119718 | B1 | 12/2017 |
| EP | 3261944 | A1 | 1/2018 |
| WO | 3301605 | A1 | 5/1983 |
| WO | 9010815 | A1 | 9/1990 |
| WO | 9206870 | A1 | 4/1992 |
| WO | 9220616 | A1 | 11/1992 |
| WO | 9404859 | A1 | 3/1994 |
| WO | 9530856 | A1 | 11/1995 |
| WO | 9738936 | A1 | 10/1997 |
| WO | 9848203 | A1 | 10/1998 |
| WO | 0007902 | A1 | 2/2000 |
| WO | 0066448 | A1 | 11/2000 |
| WO | 0107321 | A1 | 2/2001 |
| WO | 0127020 | A1 | 4/2001 |
| WO | 0166458 | A2 | 9/2001 |
| WO | 0206711 | A1 | 1/2002 |
| WO | 02085728 | A1 | 10/2002 |
| WO | 03022314 | A2 | 3/2003 |
| WO | 03089822 | A1 | 10/2003 |
| WO | 2005108280 | A2 | 11/2005 |
| WO | 2005113416 | A1 | 12/2005 |
| WO | 2006054889 | A1 | 5/2006 |
| WO | 2008008392 | A2 | 1/2008 |
| WO | 2008028240 | A1 | 3/2008 |
| WO | 2009017390 | A1 | 2/2009 |
| WO | 2009116850 | A1 | 9/2009 |
| WO | 2010110886 | A2 | 9/2010 |
| WO | 2011022756 | A1 | 3/2011 |
| WO | 2011074953 | A2 | 6/2011 |
| WO | 2011096811 | A1 | 8/2011 |
| WO | 2011099854 | A1 | 8/2011 |
| WO | 2011100937 | A1 | 8/2011 |
| WO | 2011124724 | A1 | 10/2011 |
| WO | 2012033405 | A1 | 3/2012 |
| WO | 2012044166 | A1 | 4/2012 |
| WO | 2012062821 | A1 | 5/2012 |
| WO | 2014007612 | A1 | 1/2014 |
| WO | 2017052364 | A1 | 3/2017 |
| WO | 2017053228 | A1 | 3/2017 |
| WO | 2017135824 | A1 | 8/2017 |
| WO | 2017183973 | A2 | 10/2017 |
| WO | 2018034562 | A1 | 2/2018 |
| WO | 2018034567 | A1 | 2/2018 |
| WO | 2018074927 | A1 | 4/2018 |

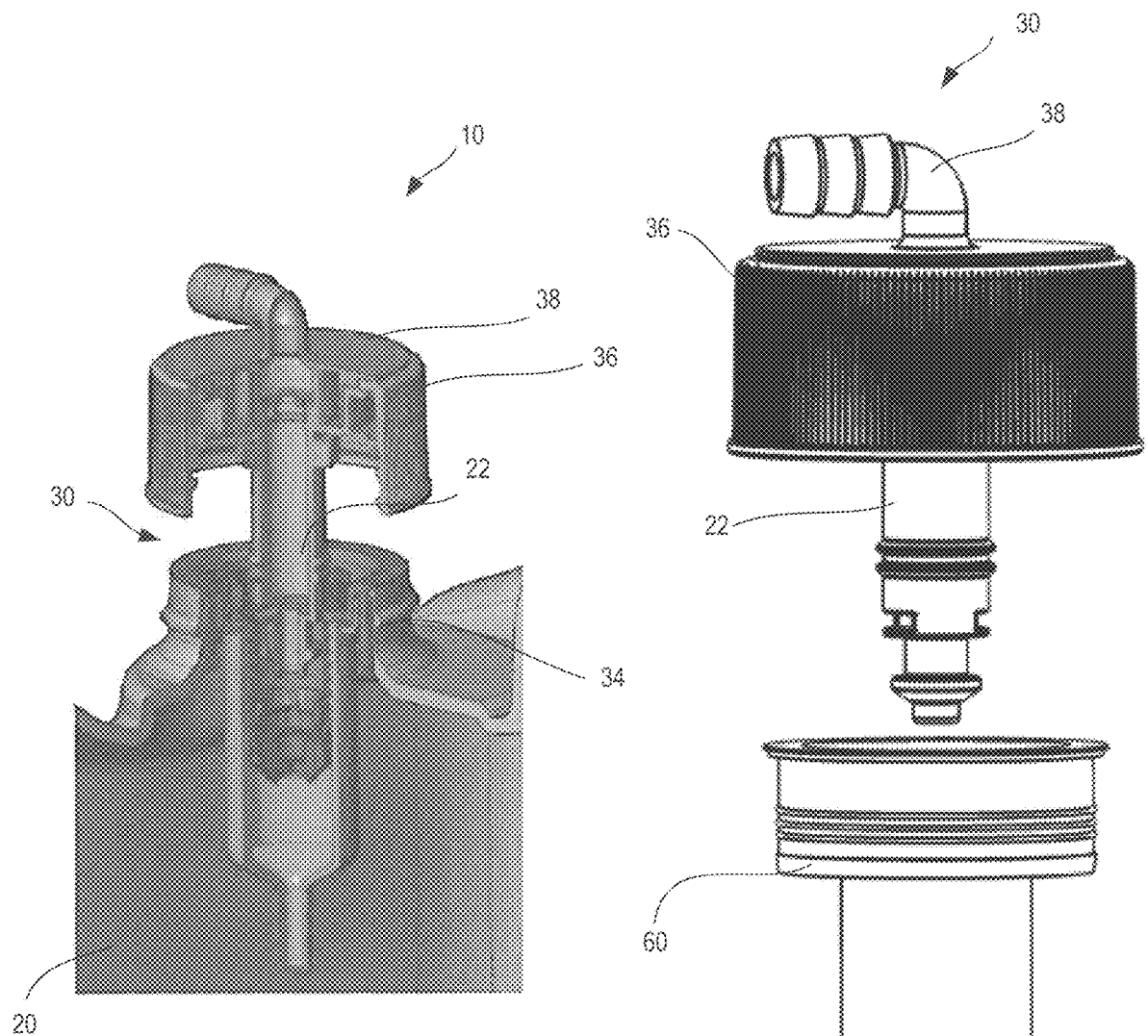
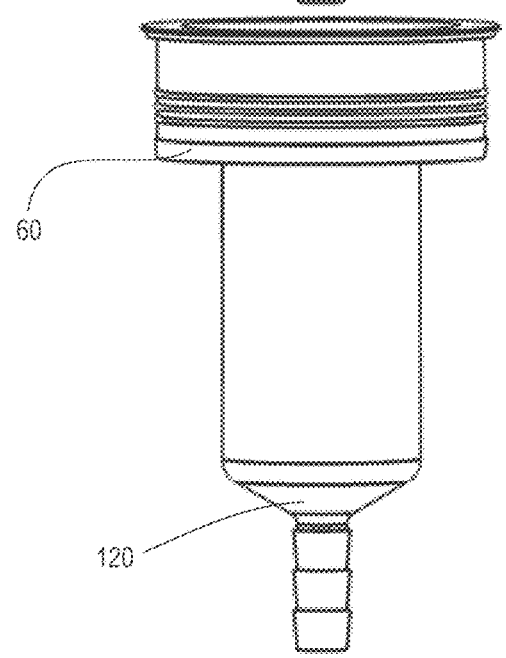
FIG. 1
FIG. 2

DISPENSING SYSTEM

RELATED APPLICATION

This application is a continuation of U.S. Nonprovisional patent application Ser. No. 16/879,958, filed May 21, 2020, which claims the benefit of U.S. Provisional Patent Application No. 62/851,866, filed May 23, 2019, the entire contents of which are incorporated herein by reference.

TECHNICAL FIELD

This disclosure relates to dispensing fitment assemblies for selectively dispensing fluid from a fluid container as related methods.

BACKGROUND

Dispensing systems are often used for dispensing fluids such as cleaning solutions (e.g., detergent, disinfectant, sanitizers, etc.), medical products (e.g., fluids administered intravenously during a medical procedure) and the like from a container (e.g., a bottle) with a connector. The connector may be connected to tubing and allow for passage of fluid stored in the container during use of the dispensing system. A dispensing probe, a hand pump and/or a nozzle can be connected to the connector for dispensing a quantity of chemical fluid (e.g., hand sanitizer). Such dispensing systems may be closed loop dispensing systems, wherein the dispensing system prevents a user from being exposed to the fluid contained in the container when the user is removing the lid or cap of the container to clean and/or dispose the container or refill fluids therein. Closed loop dispensing systems offer improved compliance to chemical safety guidelines and promote ease of use, disposal and refilling chemical products such as cleaning solutions. Such closed loop systems can often be shaped and sized to suit a variety of operations. For instance, dispensing systems can be generally rigidly shaped as bottles made of hard plastic (such as high or low density polyethylene), or can be generally flexibly shaped such as bags (e.g., "bag-and-box" dispensing system) made of polymeric materials flexible relative to the rigidly shaped bottle. In addition, the containers may be positioned upright or inverted to enhance ease of fluid delivery in a variety of operations. The dispensing systems may also include a vent (e.g., an opening on a bottle cap) to allow trapped air or other gases to escape from the container during storage or shipment of the chemical fluid.

The connectors of closed loop systems can dispense a predetermined dosage of the fluid. Such systems may include a spring-loaded valve for dispensing the predetermined dosage of chemical fluid out of the container. The connectors are typically sized and shaped according to the specific type of container in use. For instance, a connector intended to be used with a rigid bottle may not be interchangeably used with those for a flexible bag, and a connector intended for an inverted container may not be suitable for an upright container. Lack of a universal design for connectors may result in logistical difficulties when a user attempts to switch from one type of container (e.g., upright container) to a different type of container (e.g., inverted container) to allow for more effective dispensing. Connectors that include metal springs and valves also are not environmentally friendly because such components may not be recycled. For example, a user may not be able to disengage the dispensing system to separate the recyclable components of the dispensing system from the non-recyclable components, ultimately not recycling the dispensing system at all. Additionally, the user may not follow safety procedures during filling, using, storing, and disposing chemicals (e.g., corrosive chemicals such as disinfectants) due to the complexity involved in assembling and disassembling dispensing systems that include a number of different components.

SUMMARY

Embodiments disclosed herein include dispensing fitment assemblies, fitment assemblies, and related methods that can provide a user-friendly configuration and allow for use in a wide variety of dispensing applications. Moreover, embodiments disclosed herein can provide dispensing fitment assemblies, fitment assemblies, and related methods that can be environmentally friendly while at the same time reduce the likelihood that a user is exposed to a fluid within the container.

One embodiment includes a dispensing fitment assembly for selectively dispensing fluid from a fluid container. This dispensing fitment assembly embodiment includes a fitment assembly and a dispensing probe. The fitment assembly includes a fitment housing and a plug. The fitment housing is configured to operatively couple to a container opening of the fluid container. The fitment housing has an interior portion defined therein. The plug is positioned within the interior portion of the fitment housing. The plug is slidingly movable between an open position and a closed position. The dispensing probe is engageable with at least an interior surface of the plug, and the engagement between the dispensing probe and the interior surface of the plug is configured to move the plug from the closed position to the open position. The dispensing probe is disengageable from the interior surface of the plug, and the disengagement between the dispensing probe and the interior surface of the plug configured to move the plug from the open position to the closed position. When the plug is in the closed position, the dispensing probe is configured to be fluidly isolated from the fluid container to restrict flow of fluid from or to the fluid container. When the plug is in the open position, the dispensing probe is configured to be in fluid communication with the fluid container to permit flow of fluid from or to the fluid container.

In a further embodiment of the dispensing fitment assembly, the fitment housing comprises a first end and a second end longitudinally opposite to the first end. An entirety of the plug can be disposed proximal to the second end of the fitment housing and longitudinally away from the first end of the fitment housing.

In a further embodiment of the dispensing fitment assembly, the plug includes a plurality of flanges, each flange having a tapered leading portion. The dispensing probe has an end portion, the end portion has a flared portion, and the flared portion of the end portion abuts the tapered leading portion of at least a first flange of the plurality of flanges to disengage the plug from the interior portion and thereby move the plug from the closed position to the open position. The plug can include a recess, and the end portion of the dispensing probe can terminate in a distal end surface. When the flared portion of the end portion abuts the tapered leading portion of at least the first flange of the plurality of flanges, the distal end surface of the end portion of the dispensing probe is received within the recess of the plug. The end portion of the dispensing probe can include a distal portion and a proximal portion, and a cross-sectional area of the flared portion can be greater than a cross-sectional area of the distal portion or a cross-sectional area of the proximal portion.

In the above further embodiment of the dispensing fitment assembly, the interior portion of the fitment housing can include a first portion and a second portion, and the second portion can be proximal to the second end of the fitment housing, and a first cross-sectional area of the first portion can be greater than a second cross-sectional area of the second portion. The plug can include an exterior surface defining a lip, and the lip can engage against the second portion of the fitment housing when the plug is in the closed position. Engagement between the dispensing probe and the interior surface of the plug can detach the engagement between the lip and the second end of the fitment housing to move the plug from the closed position to the open position.

In a further embodiment of the dispensing fitment assembly, the fitment housing includes one or more vent passages defined proximal to the first end of the fitment housing. The one or more vent passages can be configured to place the fluid container in fluid communication with an exterior of the fluid container so as to maintain the fluid container at a pressure greater than vacuum during dispensing of fluids out of the fluid container and, optionally, at atmospheric pressure during periods of not dispensing of fluids out of the fluid container.

Another embodiment includes a dispensing fitment assembly for selectively dispensing fluid from a fluid container. This dispensing fitment assembly includes a fitment assembly and a dispensing probe. The fitment assembly includes a fitment housing and a plug. The fitment housing is coupled to a container opening of the fluid container. The fitment housing has an interior portion defined therein, and the interior portion extends between a first end and a second end longitudinally opposite to the first end. The plug is positioned within the interior portion of the fitment housing, with an entirety of the plug being disposed proximal to the second end of the fitment housing and longitudinally away from the first end of the fitment housing. The plug is slidingly movable relative to the interior portion between an open position and a closed position. The dispensing probe is engageable with the plug, with the engagement between the dispensing probe and the plug configured to move the plug from the closed position to the open position. The dispensing probe is disengageable from the plug, with the disengagement between the dispensing probe and the plug configured to move the plug from the open position to the closed position. When the plug is in the closed position, the dispensing probe is fluidly isolated from the fluid container to restrict flow of fluid from or to the fluid container. When the plug is in the open position, the dispensing probe is in fluid communication with the fluid container to permit flow of fluid from or to the fluid container.

In a further embodiment of the dispensing fitment assembly, the dispensing probe engages with the fitment housing proximal to the first end of the fitment housing.

A further embodiment of the dispensing fitment assembly can also include a one-way flow control valve positioned within the dispensing probe. The one-way flow control valve can be configured to permit passage of fluids in a dispensing direction and restrict passage of fluids in directions other than the dispensing direction.

A further embodiment of the dispensing fitment assembly can also include a fitment connector coupled to the fitment housing. The fitment connector can include a first end, a second end opposite to the first end and an internal passage extending between the first end of the fitment connector and the second end of the fitment connector. The second end of the fitment connector can be disposed longitudinally away from the plug when the plug is in the closed position. A cross-sectional area of the second end of the fitment connector can be less than a cross-sectional area of the plug, such that the second end of the fitment connector captures the plug within the internal passage of the fitment connector when the plug is disengaged from the fitment housing, thereby restricting further displacement of the plug into the fluid container when the plug moves from the closed position to the open position.

In a further embodiment of the dispensing fitment assembly, the dispensing probe is supported by a cap, the cap being removably connectable to an opening in the fluid container. The connection of the cap, while supporting the dispensing probe, to the opening in the fluid container can move the plug from the closed position to the open position. The plug can remain in the open position when the cap, while supporting the dispensing probe, remains connected to the opening in the fluid container.

An additional embodiment includes a dispensing fitment assembly for selectively dispensing fluid from a fluid container. This dispensing fitment assembly embodiment includes a fitment housing and a plug. The fitment housing is configured to be operatively coupled to a container opening of the fluid container. The fitment housing has an interior portion defined therein, and the fitment housing includes a first end and a second end longitudinally opposite to the first end. The plug is positioned within the interior portion of the fitment housing, with an entirety of the plug being disposed proximal to the second end of the fitment housing, and longitudinally away from the first end of the fitment housing. The plug is slidingly movable between an open position and a closed position. The plug includes a surface defining a lip. The lip engages against the second portion of the fitment housing when the plug is in the closed position, and the engagement of the lip against the second portion of the fitment housing is detachable by a dispensing probe inserted in the fitment housing. The detachment of the engagement moves the plug from the closed position to the open position. When the plug is in the closed position, the dispensing fitment assembly restricts flow of fluid from or to the fluid container. And, when the plug is in the open position, the dispensing fitment assembly permits flow of fluid from or to the fluid container.

In a further embodiment of the dispensing fitment assembly, the fitment housing includes one or more vent passages defined proximal to the first end of the fitment housing. The one or more vent passages are configured to place the fluid container in fluid communication with an exterior of the fluid container so as to maintain the fluid container at a pressure greater than vacuum during dispensing of fluids out of the fluid container and, optionally, at atmospheric pressure during periods of not dispensing of fluids out of the fluid container.

BRIEF DESCRIPTION OF THE DRAWINGS

The following drawings are illustrative of particular embodiments of the present invention therefore do not limit the scope of the invention. The drawings are intended for use in conjunction with the explanations in the following description. Embodiments of the invention will hereinafter be described in conjunction with the appended drawings, wherein like numerals denote like elements. The drawings are not necessarily to scale, though certain embodiments can include one or more components at the scale shown.

FIG. 1 is a sectional perspective view of a container with a dispensing fitment assembly according to certain embodiments;

FIG. 2 is a front view of the dispensing fitment assembly of FIG. 1;

DETAILED DESCRIPTION

Figure 3:
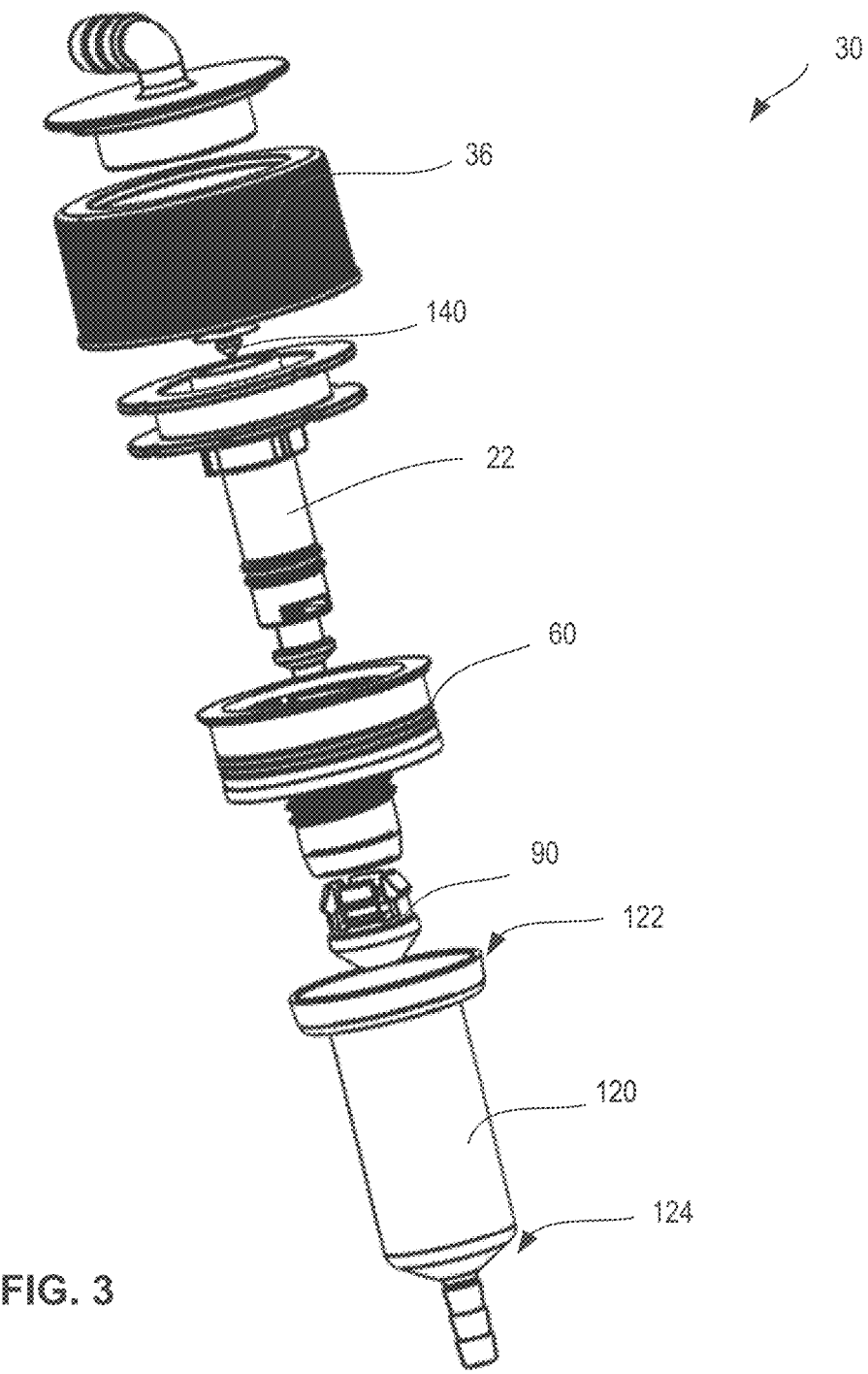
FIG. 3 is an exploded perspective view of the dispensing fitment assembly of FIG. 1.

The following detailed description is exemplary in nature and is not intended to limit the scope, applicability, or configuration of the invention in any way. Rather, the following description provides some practical illustrations for implementing embodiments of the present invention. Examples of constructions, materials, and/or dimensions are provided for selected elements. Those skilled in the art will recognize that many of the noted examples have a variety of suitable alternatives.

FIG. 1 illustrates a dispensing system 10 according to some embodiments. The dispensing system 10 comprises a container 20 for storing fluids and a dispensing fitment assembly 30 (aka dispensing fitment and adaptor assembly) for selectively dispensing fluids out of the container 20. As described previously, such containers can store fluids such as cleaning solution, disinfectant, sanitizer, and/or medical fluids while the container 20 is shown in an upright orientation. Other orientations (e.g., inverted with respect to the orientation in FIG. 1, laterally sideways with respect to the orientation in FIG. 1) are also contemplated. As seen in FIG. 1, the container 20 can be a bottle. Alternatively, the container 20 can be a bag, box, or other known containers.

A dispensing fitment assembly 30 can prevent a user from inadvertently contacting the fluid when the user disposes, dispenses, cleans or refills fluids or replenishes container 20. The dispensing fitment assembly 30 therefore can be closed or opened to selectively dispense fluids from the container 20. The dispensing fitment assembly 30 can selectively dispense fluid form the container 20 via a dispensing probe 22. Alternatively, fluids can be dispensed by other methods known in the art (e.g., pumping, pouring and the like). The container 20 may also include a dosing element (e.g., flow meter) to control flow rate of fluids.

With continued reference to FIG. 1, the container 20 comprises a container opening 34. In certain embodiments, the container opening 34 is operatively coupled to a cap 36, for instance, by a frictional connection (e.g., threads as illustrated, or by snap or push fit). The cap 36 may be removably connectable with the container opening 34, and connection of the cap 36 with the container opening 34 may allow for dispensing (e.g., fill the fluid container 20 or discharge fluid from the fluid container 20), as will be described further below.

Figure 4:
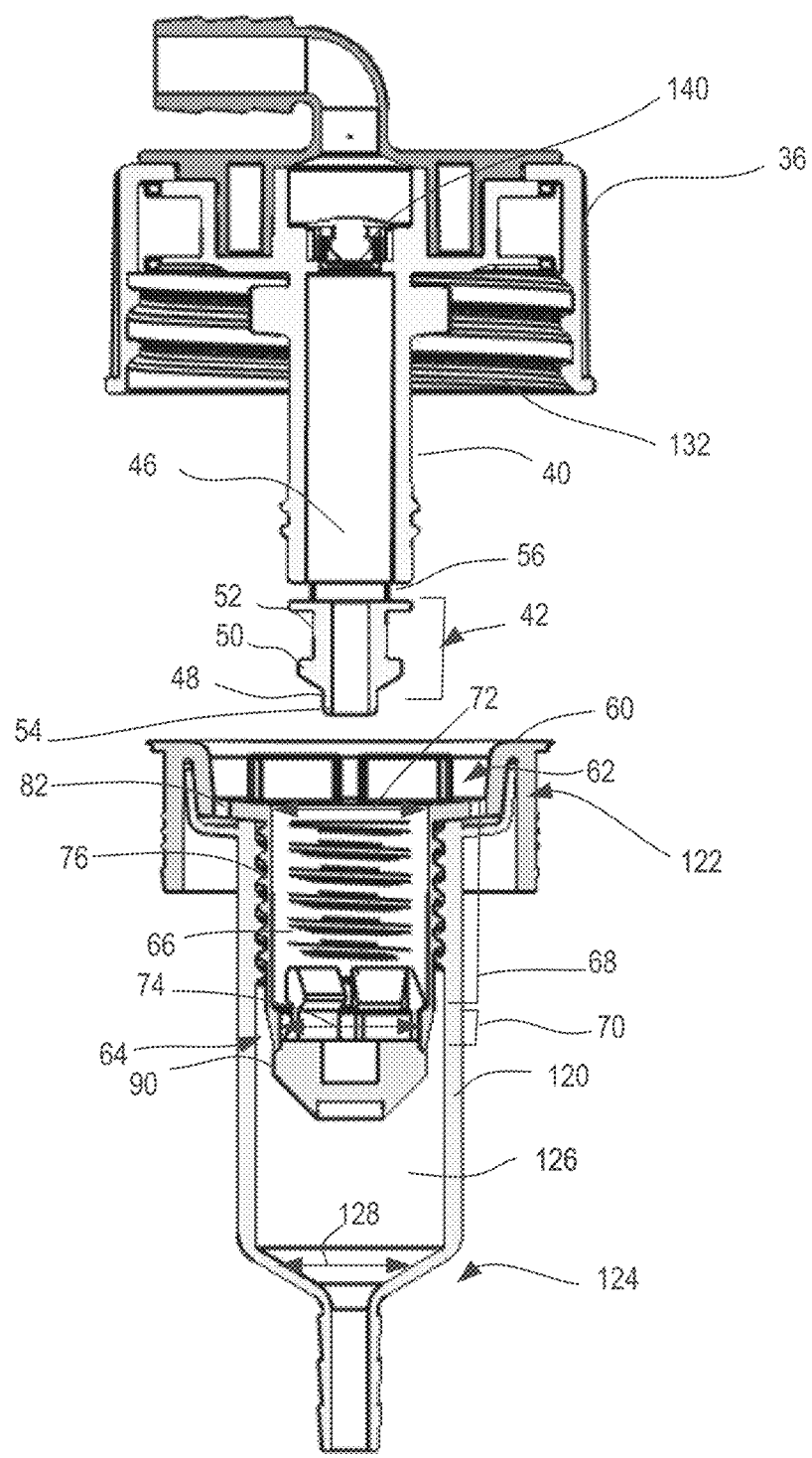
FIG. 4 is a sectional front view of the dispensing fitment assembly of FIG. 1 with the plug in the closed position.

FIGS. 2-4 illustrate various views of the dispensing probe 22 according to exemplary embodiments. The dispensing probe 22 may be supported by and/or extend from a surface 38 of the cap 36 as seen in FIG. 1. Referring again to FIGS. 2 and 4, the dispensing probe 22 includes a body 40 and an end portion 42. The body 40 may include an interior passage 46 that may be in selective fluid communication with the container 20. For instance, the interior passage 46 of the dispensing probe 22 may be in fluid communication with the container 20 when it is desired to dispense (e.g., fill the fluid container 20 or discharge fluid from the fluid container 20). The interior passage 46 of the dispensing probe 22 may be fluidly isolated from the fluid container 20 at other instances, to reduce the chances of leakage, or inadvertent contact of fluids (e.g., corrosive fluids) by a user during use.

The end portion 42 may be shaped and contoured to selectively engage with portions of a fitment assembly, as will be described further below. The end portion 42 includes a distal portion 48, a flared portion 50, and a proximal portion 52. The distal portion 48 may be closer than the flared portion 50 and the proximal portion 52 to portions of the fitment assembly. The proximal portion 52 may be closer than the distal portion 48 and the flared portion 50 to the body 40 of the dispensing probe 22. A cross-sectional area of the distal portion 48 may be less than a cross-sectional area of the flared portion 50. Further, a cross-sectional area of the proximal portion 52 may be less than a cross-sectional area of the flared portion 50. The distal portion 48 may terminate in a distal end surface 54.

The body 40 and the end portion 42 of the dispensing probe 22 may be attached to each other by an attachment portion 56. The attachment portion 56 may facilitate placing the interior passage 46 of the body 40 in selective fluid communication with the fluid container 20, and for permitting passage of fluids via the interior passage 46 into or out of the fluid container 20.

The dispensing fitment assembly 30 includes, in addition to the dispensing probe 22, a fitment assembly, various views of which are illustrated in FIGS. 2-4. Referencing FIGS. 2 and 3, the fitment assembly comprises a fitment housing 60 supported on the container opening 34. In certain advantageous aspects, the fitment housing 60 may be induction sealed to the container opening 34 to reduce inadvertent chances of fluid ingress or egress from the fluid container 20. The fitment housing 60 can be made of a polymer suitable induction sealing with a polymer of the container 20 (e.g., thermoplastics). Other recyclables and/or biocompatible materials are also contemplated.

FIG. 4 illustrates a sectional view of the dispensing fitment assembly 30. As seen in FIG. 4, the fitment housing 60 has a first end 62 and a second end 64 longitudinally opposite to the first end 62. An interior portion 66 extends between the first end 62 and the second end 64. As seen in FIG. 4, the dispensing probe 22 engages with the fitment housing 60 proximal to the first end 62 of the fitment housing 60.

In certain advantageous embodiments, the interior portion 66 may be contoured to permit selective fluid communication between the container 20 and the dispensing probe 22, as will be described further below. In one such example illustrated in FIG. 4, the interior portion 66 of the fitment housing 60 includes a first portion 68 and a second portion 70. The first portion 68 and the second portion 70 may each have either constant cross-sectional area or variable cross-sectional area. For instance, the first portion 68 may have a first cross-sectional area 72 and the second portion 70 may have a second cross-sectional area 74. As seen in FIG. 4, the first cross-sectional area 72 of the first portion 68 is greater than the second cross-sectional area 74 of the second portion 70. In some such embodiments, the first portion 68 may extend a substantial length of the fitment housing 60 from the first portion 68. In such embodiments, the second portion 70 may be confined to being proximal to the second end 64 of the fitment housing 60. Alternatively, in other embodiments, the first portion 68 and the second portion 70 may extend over different lengths of the fitment housing 60 than those illustrated. Still further, the fitment housing 60 may be contoured such that the cross-sectional area of the interior portion 66 in the proximity of the second end 64 is less than the cross-sectional area of the interior portion 66 at other longitudinal locations of the fitment housing 60. Such embodiments may advantageously place the dispensing probe 22 in selective fluid communication with the container 20, as will be described further below.

An exterior surface of the fitment housing 60 may engage with a fitment connector 120, as will be described further below. Accordingly, in certain embodiments, the exterior surface of the fitment housing 60 may include threads 76, grooves, or other types of frictional connectors to permit connection to a fitment connector 120.

Figure 5:
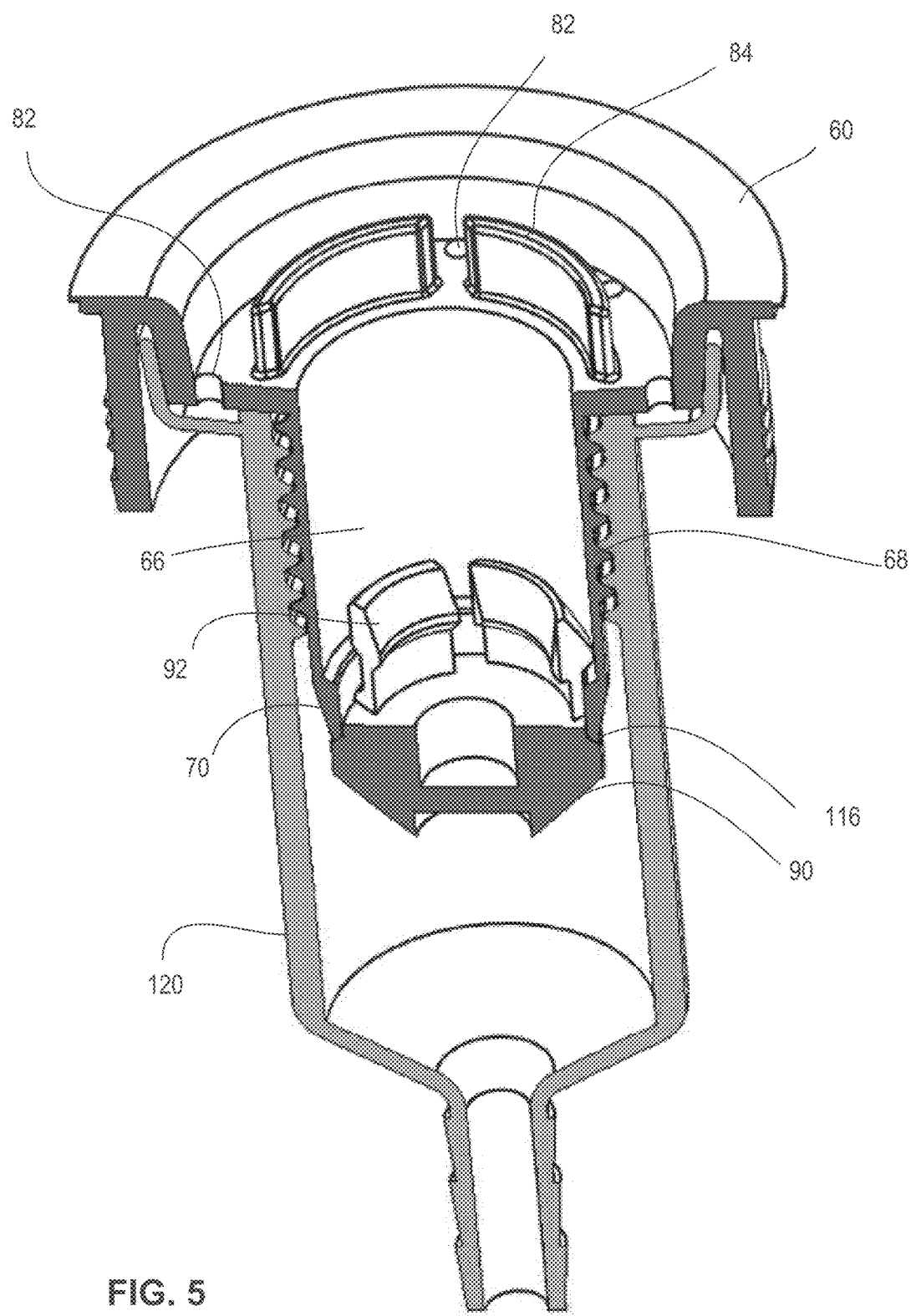
FIG. 5 is a sectional perspective view of the dispensing fitment assembly of FIG. 1 illustrated to show the plug in the closed position.

Referencing FIGS. 4 and 5, the fitment housing 60 also has one or more vent passages 82 defined proximal to the first end 62 of the fitment housing 60. In the illustrated embodiment, a plurality of evenly-spaced vent passages 82 are distributed around the perimeter of the fitment housing 60, however, additional or fewer vent passages 82 can be provided. The vent passages 82 may place the fluid container 20 in fluid communication with an exterior of the fluid container 20 so as to maintain the fluid container 20 at a pressure greater than vacuum during dispensing of fluids out of the fluid container 20. Such pressure in the fluid container 20 may be equal to atmospheric pressure during static periods when fluids are not being dispensed out of the fluid container.

Referring again to FIGS. 4 and 5, in some embodiments, the fitment housing 60 may include one or more keyed protrusions 84 at the first end 62. In FIG. 5, keyed protrusions 84 are illustrated as being evenly distributed throughout a perimeter of the fitment housing 60. However, a single keyed protrusion may also be provided. The keyed protrusion(s) may facilitate aligning the dispensing probe 22 with the cap 36 such that the end portion 42 of the dispensing probe 22 may be generally coaxial with the interior portion 66 of the fitment housing 60 and/or with the plug 90.

Figure 6:
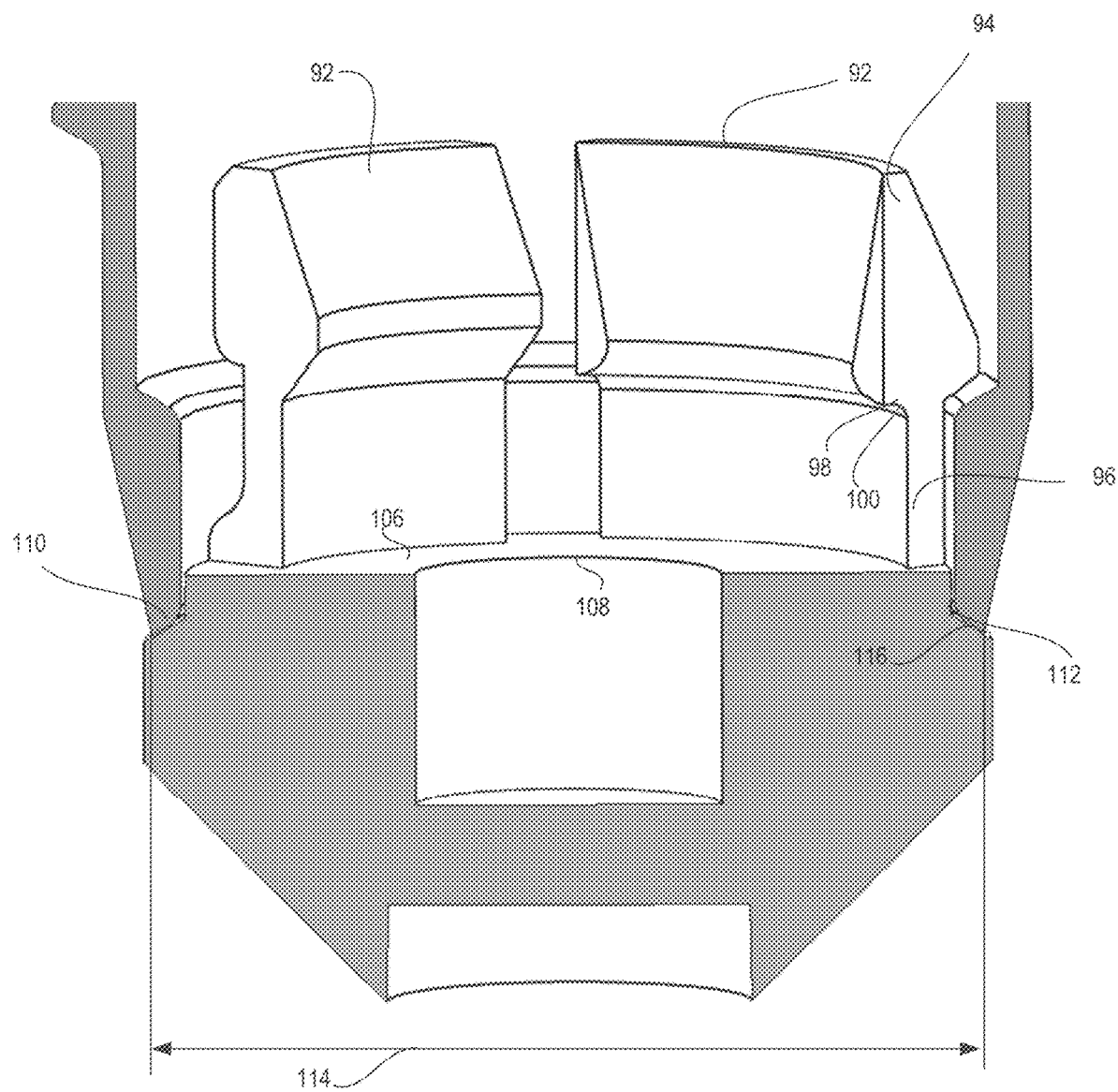
FIG. 6 is an enlarged sectional view of the dispensing fitment assembly of FIG. 1 illustrated to show the plug in the closed position.
Figure 8:
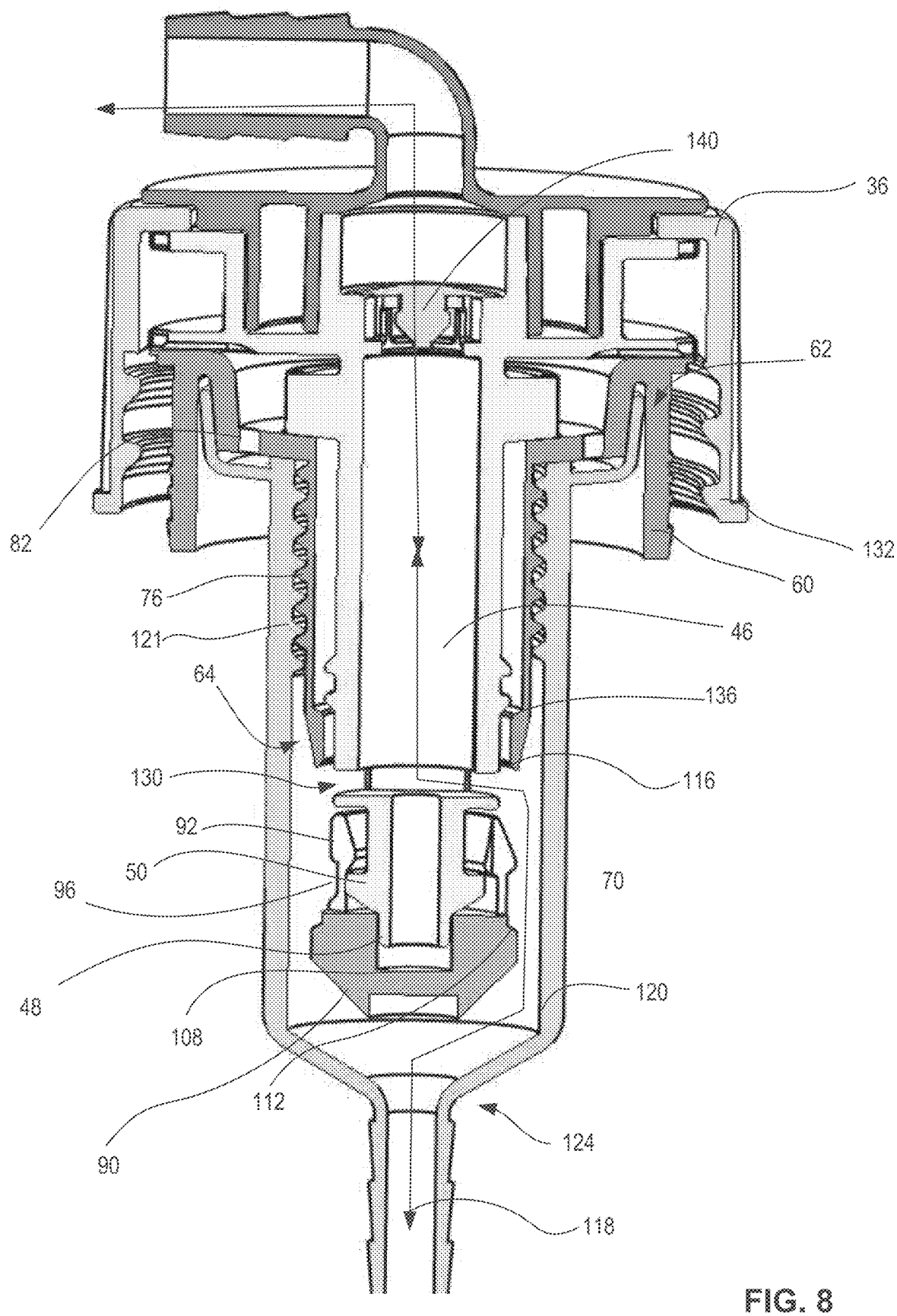
FIG. 8 is sectional perspective view of the dispensing fitment assembly of FIG. 1 illustrated to show the plug in the open position.
Figure 9:
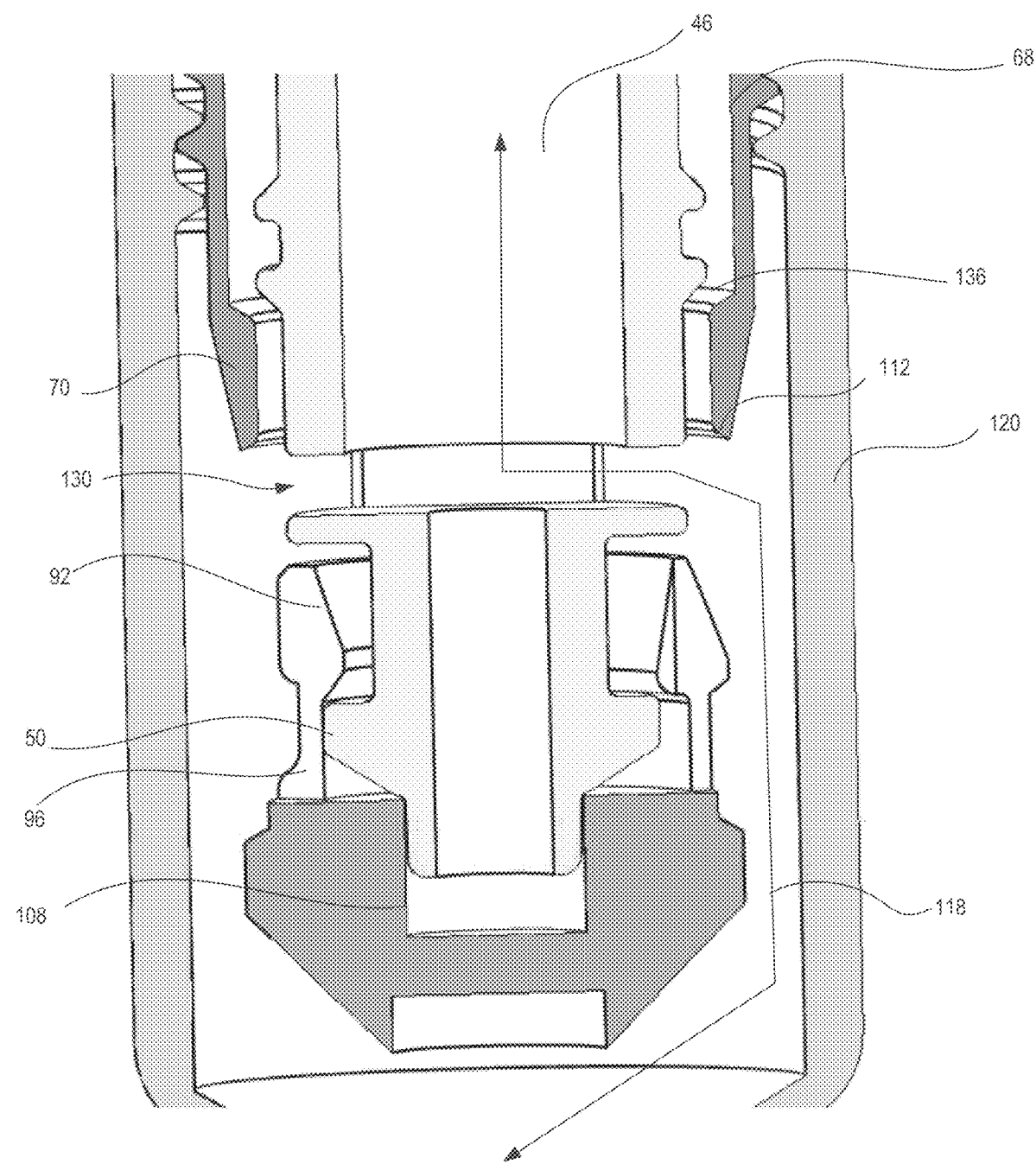
FIG. 9 is an enlarged sectional perspective view of the dispensing fitment assembly of FIG. 1 illustrated to show the plug in the open position.
Figure 10:
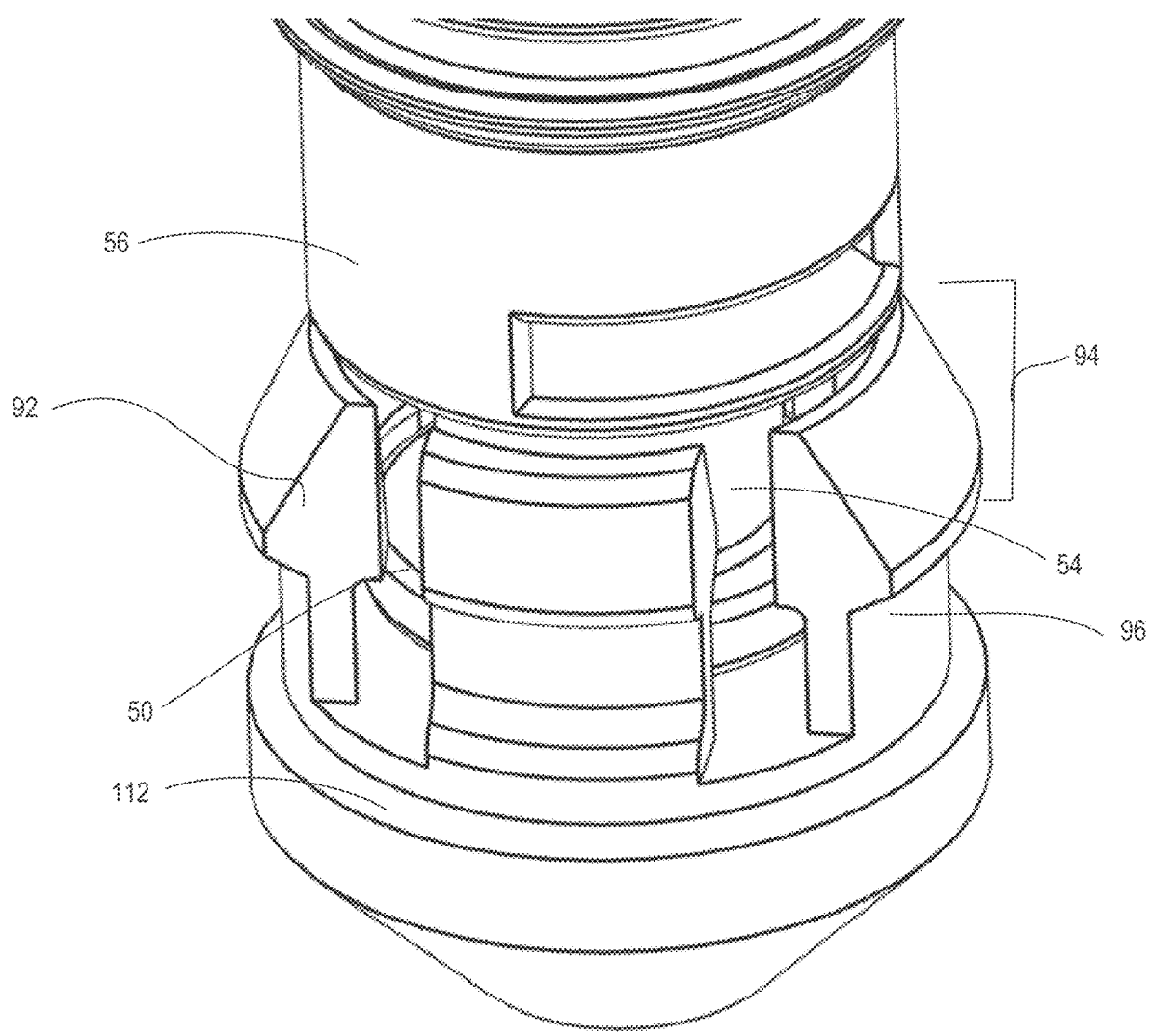
FIG. 10 is an enlarged perspective view illustrated to show the plug and the end portion of the dispensing probe during engagement with the plug.

With reference to FIGS. 2-5, the connector comprises a plug 90. The plug 90 can be moved between a closed position and an open position. FIGS. 4-6 illustrate the plug 90 in the closed position, while FIGS. 8-10 illustrate the plug 90 in the open position. Referring again to FIGS. 4 and 5, the plug 90 may advantageously be positioned within the interior portion 66 of the fitment housing 60, and may facilitate placing the dispensing probe 22 in selective fluid communication with the fluid container 20. As seen in FIGS. 4 and 5, an entirety of the plug 90 may be disposed proximal to the second end 64 of the fitment housing 60, and longitudinally away from the first end 62 of the fitment housing 60. Such embodiments may offer ease of engagement and disengagement between the fitment housing 60 and the plug 90 and more easily establish selective fluid communication between the dispensing probe 22 and the fluid container 20.

In an embodiment, the plug 90 may be slidingly movable relative to the interior portion 66 between the open position and the closed position. When the plug 90 is in the closed position, the dispensing probe 22 is fluidly isolated from the fluid container 20 to restrict flow of fluid from or to the fluid container 20. When the plug 90 is in the open position, the dispensing probe 22 is in fluid communication with the fluid container 20 to permit flow of fluid from or to the fluid container 20.

Figure 7:
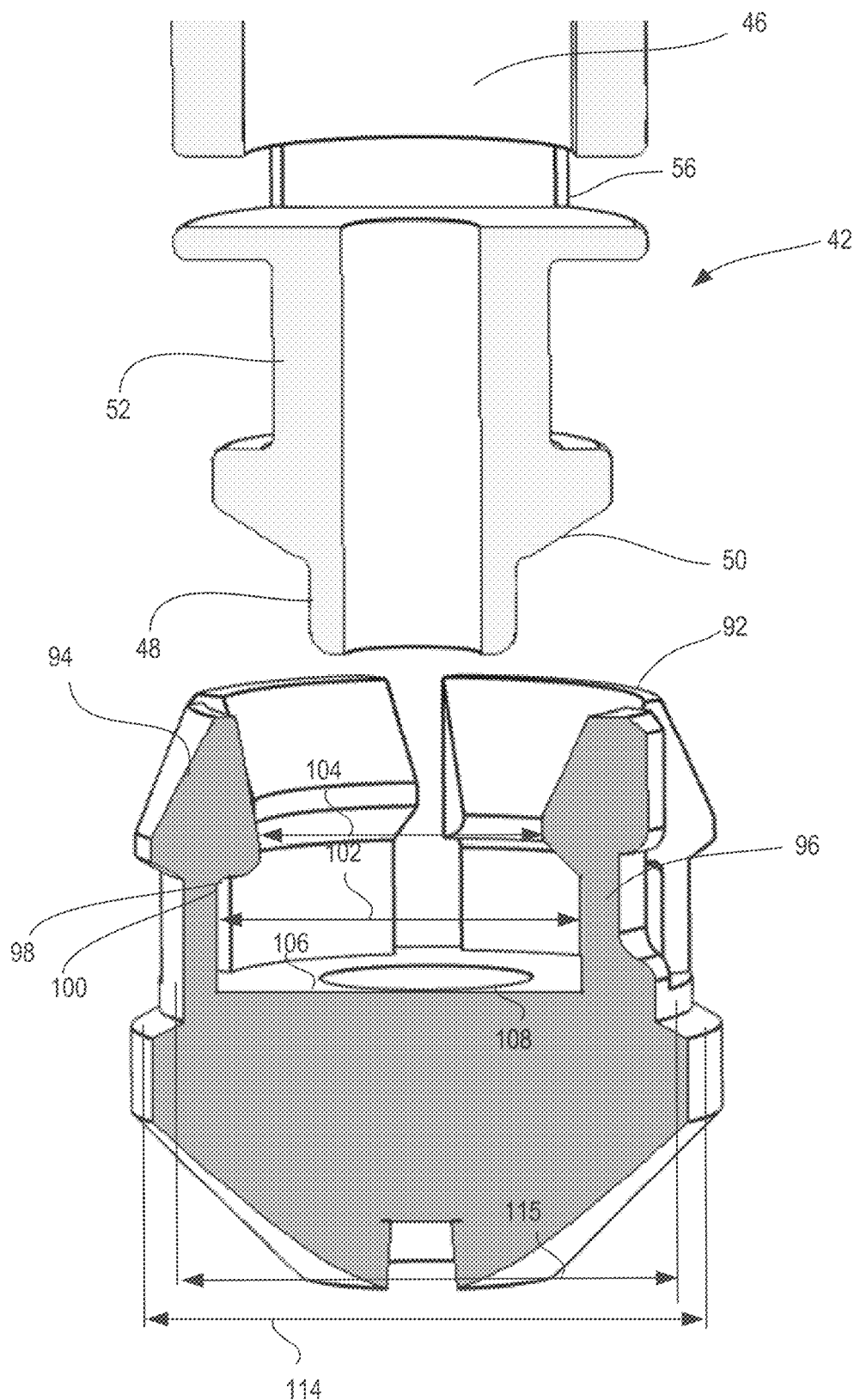
FIG. 7 is an enlarged sectional view of the dispensing fitment assembly of FIG. 1 illustrated to show the plug and the end portion of the dispensing probe during engagement/disengagement with the plug.

FIGS. 6 and 7 illustrate enlarged views of the plug 90. According to certain examples, the plug 90 may include a plurality of flanges 92. The flanges 92 extend toward the dispensing probe 22, and may be contoured to have frictional engagement with portions of the dispensing probe 22. In advantageous aspects, frictional engagement between the flanges 92 and portions of the dispensing probe 22 may be useful for disengaging the plug 90 from the second end 64 of the fitment housing 60, or engaging the plug 90 with the second end 64 of the fitment housing 60. Thus, frictional engagement/disengagement between the flanges 92 and portions of the dispensing probe 22 may facilitate frictional disengagement/engagement respectively between the plug 90 and the second end 64 of the fitment housing 60, thereby moving the plug 90 between the closed and the open positions.

Referencing FIGS. 6 and 7, each flange includes a tapered leading portion 94 that may face and/or encounter an end portion 42 of the dispensing probe 22, as the dispensing probe 22 is being brought into proximity with the plug 90. The tapered leading portion 94 may taper radially inward to form a generally frustoconical shape to guide the end portion 42 of the dispensing probe 22. The flange may also include an upright portion 96 positioned in the vicinity of the tapered leading portion 94. For instance, in an illustrative aspect, an outermost edge 98 of the tapered leading portion 94 may abut an outermost edge 100 of the upright portion 96 such that the tapered leading portion 94 and the upright portion 96 are directly adjacent to each other. A cross-sectional area 102 of the upright portion 96 may, advantageously be greater than a smallest cross-sectional area 104 of the tapered leading portion 94, as illustrated in FIG. 7. As will be described further below, such shapes and profiles may facilitate ease of engagement and disengagement of the plug 90 relative to the fitment housing 60.

In certain advantageous aspects of the present disclosure, the plug 90 includes additional contoured portions to further facilitate disengagement or engagement of the plug 90 with the fitment housing 60. For instance, with continued reference to FIGS. 6 and 7, the plug 90 includes a generally planar surface 106 on which a recess 108 is defined centrally therein. The recess 108 may be located adjacent to (or in the) upright portion 96. The recess 108 may receive portions of the dispensing probe 22 during disengagement or engagement of the plug 90 with the fitment housing 60. The plug 90 may also include an exterior surface 110 defining a lip 112. The lip 112 may be directly adjacent to the upright portion 96. The lip 112 may have an exterior cross-sectional area 114 greater than an exterior cross-sectional area 115 of the upright portion 96. As seen in FIG. 6, the lip 112 may engage against the second portion 70 of the fitment housing 60, to maintain the plug 90 is in the closed position. An outermost edge 116 of the second portion 70 may be in contact with the lip 112 when the plug 90 is in the closed position. Accordingly, the exterior cross-sectional area 114 of the lip 112 in the vicinity of the outermost edge 116 may be greater than an interior cross-sectional area (e.g., second cross-sectional area 74) of the second portion 70.

Referring back to FIGS. 3 and 4, the fitment assembly includes a fitment connector 120. The fitment connector 120 may be coupled to the fitment housing 60. In the illustrated embodiment, the fitment connector 120 includes internal threads 121 that engage with external threads 76 of the fitment housing 60. However, other types of connections between the fitment housing 60 and the fitment connector 120 are contemplated. The fitment connector 120 may be generally elongate and include a first end 122, a second end 124 opposite to the first end 122 and an internal passage 126 extending between the first end 122 and the second end 124. The coupling between the fitment connector 120 and the fitment housing 60 may position the first end 62 of the fitment connector 120 near the first end 122 of the fitment housing 60, and the second end 64 of the fitment connector 120 extending further longitudinally away from the second end 124 of the fitment housing 60. Accordingly, the second end 64 of the fitment housing 60 may be captured within and/or surrounded by the second end 124 of the fitment housing 60.

With continued reference to FIG. 4, the second end 124 of the fitment connector 120 is disposed longitudinally away from the plug 90. Further, as seen from FIG. 4, in advantageous aspects, a cross-sectional area 128 of the second end 124 of the fitment connector 120 may be less than a cross-sectional area of the plug 90. As described previously, the plug 90 may be contoured to have variable cross-section. In such cases, a cross-sectional area of at least a portion of the plug 90 (e.g., exterior cross-sectional area 114 or 115 illustrated in FIG. 7) may be greater than a cross-sectional area 128 (shown in FIG. 4) of the second end 124 of the fitment connector 120. In such embodiments, the second end 124 of the fitment connector 120 captures the plug 90 within the internal passage 126 of the fitment connector 120 when the plug 90 is disengaged from the fitment housing 60. Such embodiments may advantageously restrict further displacement of the plug 90 into the fluid container 20 when the plug 90 moves from the closed position to the open position.

As described previously, the container 20 may be induction sealed with the fitment housing 60. The induction sealing may be performed after the fitment housing 60, fitment connector 120 and plug 90 are assembled such that the plug 90 is in the closed position. To dispense fluid (e.g., to fill into or discharge from) the cap 36 along with the dispensing probe 22 may be brought into proximity with the container opening 34, and attached therewith. For instance, the cap 36 may include internal threads 132 that may engage with corresponding threads on the container opening 34. As the cap 36 is frictionally engaged with the container opening 34, the dispensing probe 22 may advance into the interior portion 66 of the fitment housing 60.

With reference to FIGS. 4-7, the plug 90 may be seated at the second end 64 of the fitment housing 60, and the lip 112 may abut an outermost edge 116 of the second end 64 of the fitment housing 60. The interior portion 66 of the fitment housing 60 may be fluidly isolated from the container 20 at this position. As the dispensing probe 22 is being brought into the interior portion 66 of the fitment housing 60, the distal portion 48 of the dispensing probe 22 may approach the tapered leading portion 94 of the plug 90, and may be moved toward the upright portion 96 of the plug 90. As the dispensing probe 22 is further brought into proximity (e.g., by screw-threaded engagement of the cap 36 with the container opening 34), the flared portion 50 of the dispensing probe 22 may frictionally engage against one or more flanges 92. The frictional engagement of the flared portion 50 of the dispensing probe 22 may bear against the flange, and thereby unseat and/or detach the plug 90 from the second end 64 of the fitment housing 60. Further movement of the dispensing probe 22 relative to the plug 90 may result in the distal portion 48 being received within the recess 108 of the plug 90, the flared portion 50 being received at least partially in the upright portion 96 of the plug 90, and the flange(s) at least partially surrounding the proximal portion 52, as illustrated in FIG. 10.

Referencing FIG. 8, a gap 130 may be created between the plug 90 and the fitment housing 60, thereby permitting passage of fluids in a dispensing direction (e.g., along the arrows 118 illustrated in FIG. 8). Dispensing may be a filling operation of the container 20, in which case, the dispensing direction may correspond flow of fluids via the interior passage 46 thereof, and into the fitment connector 120 and to the container 20. Alternatively, dispensing may be a discharge operation, in which case, the dispensing direction may correspond to the flow of fluids from the container 20, through the fitment connector 120, and via the interior passage 46 of the dispensing probe 22.

To move the plug 90 from the open position to the closed position, the cap 36 may be detached from the container opening 34 (e.g., by unscrewing the internal threads 132 of the cap 36 that may engage with corresponding threads on the container opening 34). As the cap 36 is frictionally disengaged with the container opening 34, the dispensing probe 22 may be retracted from the interior portion 66 of the fitment housing 60.

With reference to FIGS. 8-10, the plug 90 may be retracted with the dispensing probe 22 due to engagement between the distal portion 48 and the recess 108 until the lip 112 abuts the outermost edge of the second end 64 of the fitment housing 60. At this instance, the tapered leading portion 94 may engage with a transition region 136 that separates the first portion 68 and the second portion 70. As the dispensing probe 22 is further retracted (e.g., by continuing to unscrew the threads 132 of the cap 36), the flared portion 50 may be unseated and may retract relative to the upright portion 96 of the plug 90. Continued retraction of the dispensing probe 22 may result in the travel of the flared portion 50 relative to the tapered leading portion 94 until the dispensing probe 22 is fully retracted relative to the plug 90, and the flanges 92 seated against the transition region 136.

Referring back to FIGS. 3 and 4, the fitment assembly includes a flow control valve 140 which may selectively permit or restrict flow of fluid therethrough to facilitate controlled flow of fluid into or out of the container 20. In certain advantageous aspects, the valve can be a one-way flow control valve 140. In such embodiments, the one-way flow control valve 140 may permit passage of fluids in a dispensing direction and restrict passage of fluids in directions other than the dispensing direction. In some aspects dispensing may include filling the container 20. Accordingly, a dispensing direction may be from a fluid source, via the dispensing probe 22 to the container 20. In other aspects, dispensing may include discharging from the container 20. Accordingly, a dispensing direction may be from the container 20, via a dispensing probe 22 to a fluid delivery line. In either aspect, the one-way flow control valve 140 may restrict passage of fluids in directions other than the dispensing direction. In certain aspects, the one-way flow control valve 140 may not be used when the container 20 is being filled and may only be used when fluid is discharged from the container 20. Accordingly, the one-way flow control valve 140 may restrict flow of fluids in directions other than through the interior passage 46 of the dispensing probe 22 and toward the container 20.

In the illustrated embodiment, the flow control valve 140 is housed within the dispensing probe 22. When the dispensing probe 22 engages with the plug 90 and moves the plug 90 to the open position, the flow control valve 140 may be positioned proximal to the first end 62 of the fitment housing 60 and surrounded by the cap 36. Referencing FIG. 8, as fluid is being dispensed in the dispensing direction (e.g., along arrows 118), the flow control valve 140 may selectively permit or restrict flow of fluid therethrough to facilitate controlled flow of fluid into or out of the container 20.

Embodiments disclosed herein have one or more advantages. Closed loop connectors such as those described herein can protect the user from inadvertently being exposed to fluids (e.g., chemicals, corrosive reagents and the like) present in the container 20, thereby offering safe dispensing operation. The connector can be made with recyclable materials and not have any metal components or non-recyclable parts, thereby allowing a user to easily rinse and recycle the container 20 and the connector. Such connectors are also of a universal design, allowing users to easily be connected to containers of different shapes, sizes, and for different applications.

What is claimed is:

1. A dispensing fitment assembly for selectively dispensing fluid from a fluid container, the dispensing fitment assembly comprising:
   a fitment assembly, comprising:
      a fitment housing configured to operatively couple to a container opening of the fluid container, the fitment housing having an interior portion defined therein,
      a plug positioned within the interior portion of the fitment housing, the plug being slidingly movable between an open position and a closed position, the plug comprising a plurality of flanges and a lip, wherein each flange includes a tapered leading portion at an interior surface of the plug, and wherein the lip is defined at an exterior surface of the plug, the exterior surface of the plug facing the fitment housing and the interior surface of the plug being opposite the exterior surface of the plug; and
   a dispensing probe engageable with the plug to move the plug between the open position and the closed position,
   when the plug is in the closed position flow of fluid from or to the fluid container is restricted,
   when the plug is in the open position flow of fluid from or to the fluid container is permitted.

2. The dispensing fitment assembly of claim 1, wherein the fitment housing comprises a first end and a second end longitudinally opposite to the first end.

3. The dispensing fitment assembly of claim 2, wherein an entirety of the plug is disposed proximal to the second end of the fitment housing and longitudinally away from the first end of the fitment housing.

4. The dispensing fitment assembly of claim 1, wherein the dispensing probe having an end portion, the end portion having a flared portion, the flared portion of the end portion abutting the tapered leading portion of at least a first flange of the plurality of flanges to disengage the plug from the interior portion and thereby move the plug from the closed position to the open position.

5. The dispensing fitment assembly of claim 4, wherein the plug comprises a recess, the end portion of the dispensing probe terminating in a distal end surface, wherein, when the flared portion of the end portion abuts the tapered leading portion of at least the first flange of the plurality of flanges, the distal end surface of the end portion of the dispensing probe is received within the recess of the plug.

6. The dispensing fitment assembly of claim 4, wherein the interior portion of the fitment housing includes a first portion and a second portion, the second portion being proximal to the second end of the fitment housing, a first cross-sectional area of the first portion being greater than a second cross-sectional area of the second portion.

7. The dispensing fitment assembly of claim 6, wherein the lip engages against the second portion of the fitment housing when the plug is in the closed position.

8. The dispensing fitment assembly of claim 7, wherein engagement between the dispensing probe and the interior surface of the plug detaches the engagement between the lip and the second end of the fitment housing to move the plug from the closed position to the open position.

9. The dispensing fitment assembly of claim 4, wherein the end portion of the dispensing probe includes a distal portion and a proximal portion, a cross-sectional area of the flared portion being greater than a cross-sectional area of the distal portion or a cross-sectional area of the proximal portion.

10. The dispensing fitment assembly of claim 1, wherein the fitment housing comprises one or more vent passages defined proximal to the first end of the fitment housing, the one or more vent passages being configured to place the fluid container in fluid communication with an exterior of the fluid container so as to maintain the fluid container at a pressure greater than vacuum during dispensing of fluids out of the fluid container and, optionally, at atmospheric pressure during periods of not dispensing of fluids out of the fluid container.

11. A dispensing fitment assembly for selectively dispensing fluid from a fluid container, the dispensing fitment assembly comprising:
    a fitment assembly, comprising:
       a fitment housing coupled to a container opening of the fluid container, the fitment housing having an interior portion defined therein, the interior portion extending between a first end and a second end longitudinally opposite to the first end,
       a plug positioned within the interior portion of the fitment housing, the plug being slidingly movable relative to the interior portion between an open position and a closed position, the plug comprising a plurality of flanges and a lip, wherein each flange includes a tapered leading portion at an interior surface of the plug, and wherein the lip is defined at an exterior surface of the plug, the exterior surface of the plug facing the fitment housing and the interior surface of the plug being opposite the exterior surface of the plug; and
    a dispensing probe engageable with, and disengageable from, the plug so as to move the plug between the open position and the closed position,
    when the plug is in the closed position flow of fluid from or to the fluid container is restricted,
    when the plug is in the open position flow of fluid from or to the fluid container is permitted.

12. The dispensing fitment assembly of claim 11, wherein the dispensing probe engages with the fitment housing proximal to the first end of the fitment housing.

13. The dispensing fitment assembly of claim 11, further comprising a one-way flow control valve positioned within the dispensing probe, the one-way flow control valve being configured to permit passage of fluids in a dispensing direction and restrict passage of fluids in directions other than the dispensing direction.

14. The dispensing fitment assembly of claim 11, further comprising a fitment connector coupled to the fitment housing, the fitment connector comprising a first end, a second end opposite to the first end and an internal passage extending between the first end of the fitment connector and the second end of the fitment connector.

15. The dispensing fitment assembly of claim 14, wherein the second end of the fitment connector is disposed longitudinally away from the plug when the plug is in the closed position.

16. The dispensing fitment assembly of claim 15, wherein a cross-sectional area of the second end of the fitment connector being less than a cross-sectional area of the plug, such that the second end of the fitment connector captures the plug within the internal passage of the fitment connector when the plug is disengaged from the fitment housing, thereby restricting further displacement of the plug into the fluid container when the plug moves from the closed position to the open position.

17. The dispensing fitment assembly of claim 11, wherein the dispensing probe is supported by a cap, the cap being removably connectable to an opening in the fluid container, and wherein the connection of the cap, while supporting the dispensing probe, to the opening in the fluid container moves the plug from the closed position to the open position.

18. The dispensing fitment assembly of claim 17, wherein the plug remains in the open position when the cap, while supporting the dispensing probe, remains connected to the opening in the fluid container.

19. A dispensing fitment assembly for selectively dispensing fluid from a fluid container, the dispensing fitment assembly comprising:

a fitment housing operatively coupled to a container opening of the fluid container, the fitment housing having an interior portion defined therein, and the fitment housing comprising a first end and a second end longitudinally opposite to the first end, a plug positioned within the interior portion of the fitment housing, an entirety of the plug being disposed proximal to the second end of the fitment housing, and longitudinally away from the first end of the fitment housing, the plug being slidingly movable between an open position and a closed position, and the plug comprising a plurality of flanges and a lip, wherein each flange includes a tapered leading portion at an interior surface of the plug, wherein the lip is defined at an exterior surface of the plug, the exterior surface of the plug facing the fitment housing and the interior surface of the plug being opposite the exterior surface of the plug, the lip engaging against the second portion of the fitment housing when the plug is in the closed position, the engagement of the lip against the second portion of the fitment housing being detachable by a dispensing probe inserted in the fitment housing, the detachment of the engagement moving the plug between the closed position and the open position.

20. The dispensing fitment assembly of claim 19, wherein the fitment housing comprises one or more vent passages defined proximal to the first end of the fitment housing, the one or more vent passages being configured to place the fluid container in fluid communication with an exterior of the fluid container so as to maintain the fluid container at a pressure greater than vacuum during dispensing of fluids out of the fluid container and, optionally, at atmospheric pressure during periods of not dispensing of fluids out of the fluid container.

* * * * *